(12) United States Patent
Kim

(10) Patent No.: US 12,065,107 B2
(45) Date of Patent: Aug. 20, 2024

(54) WIPER CONNECTOR AND WIPER BLADE ASSEMBLY

(71) Applicant: CAP CORPORATION, Gyeongsangbuk-Do (KR)

(72) Inventor: Myoung Yeon Kim, Ulsan (KR)

(73) Assignee: CAP CORPORATION, Gyeongsangbuk-Do (KR)

(*) Notice: Subject to any disclaimer, the term of this patent is extended or adjusted under 35 U.S.C. 154(b) by 0 days.

(21) Appl. No.: 18/186,510

(22) Filed: Mar. 20, 2023

(65) Prior Publication Data
US 2023/0294642 A1 Sep. 21, 2023

(30) Foreign Application Priority Data

Mar. 21, 2022 (KR) .................. 10-2022-0035003

(51) Int. Cl.
*B60S 1/40* (2006.01)
*B60S 1/34* (2006.01)
*B60S 1/52* (2006.01)

(52) U.S. Cl.
CPC .......... *B60S 1/4048* (2013.01); *B60S 1/4045* (2013.01); *B60S 1/522* (2013.01); *B60S 1/3415* (2013.01); *B60S 2001/4051* (2013.01); *B60S 2001/4054* (2013.01)

(58) Field of Classification Search
CPC .... B60S 1/4038; B60S 1/4045; B60S 1/4048; B60S 2001/4051; B60S 2001/4054
USPC ....................................... 15/250.32
See application file for complete search history.

(56) References Cited

U.S. PATENT DOCUMENTS

2017/0066418 A1  3/2017 Schober et al.
2018/0334139 A1  11/2018 Mouleyre et al.

FOREIGN PATENT DOCUMENTS

| DE | 112015003232 T5 |   | 5/2017 |
|----|------|---|--------|
| FR | 2781741 | * | 2/2000 |
| FR | 2981622 | * | 4/2013 |
| JP | 2013544213 A |  | 12/2013 |
| KR | 101681224 B1 |  | 12/2016 |
| WO | 2006/106006 | * | 10/2006 |
| WO | 2012072748 A1 |  | 6/2012 |

OTHER PUBLICATIONS

Extended European Search Report for the European Patent Application No. 23162086.5 issued by the European Patent Office on Aug. 9, 2023.
Office Action on the Korean Patent Application No. 10-2022-0035003 issued by the Korean Patent Office on Aug. 29, 2023.

* cited by examiner

*Primary Examiner* — Gary K. Graham
(74) *Attorney, Agent, or Firm* — IP & T GROUP LLP

(57) ABSTRACT

The present disclosure relates to a wiper connector, a wiper blade assembly, and a wiper device, and a wiper connector for mutually connecting a wiper blade and a wiper arm includes an insertion portion inserted into the wiper arm and disposed at one side of a washing liquid spray nozzle provided on the wiper arm, and a fixing portion integrally provided with the insertion portion and fixed to the wiper blade, wherein the insertion portion includes a first fastener caught by a hole provided in an upper surface of the wiper arm, and a second fastener caught by a rib provided inside the wiper arm.

9 Claims, 14 Drawing Sheets

FIG. 8
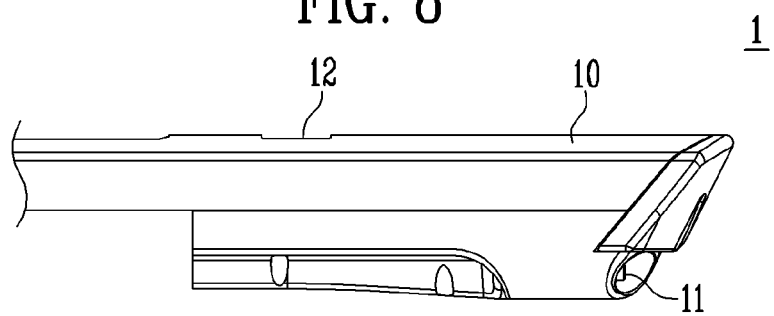
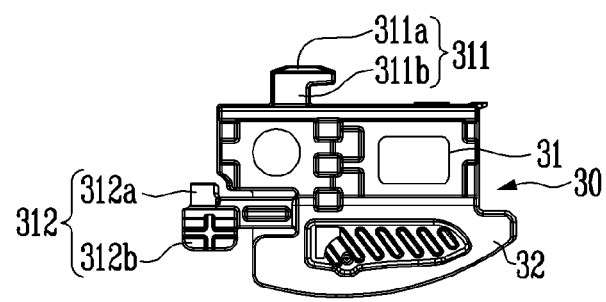

WIPER CONNECTOR AND WIPER BLADE ASSEMBLY

CROSS-REFERENCE TO RELATED APPLICATION

This application claims the benefit of Korean Patent Application No. 10-2022-0035003, filed on Mar. 21, 2022 in the Korean Intellectual Property Office, the disclosure of which is incorporated herein by reference.

BACKGROUND

1. Field

The present disclosure relates to a wiper connector, a wiper blade assembly, and a wiper device.

2. Description of the Related Art

In general, wiper devices are installed in a vehicle or the like to wipe a surface of a windshield. Such a wiper device includes a wiper motor, a wiper arm, a wiper blade, etc., and an adapter may be used for structural connection between the wiper arm and the wiper blade.

Such a wiper arm has a base end connected to a rotational shaft of the wiper motor and rotated reciprocally by the wiper motor, one or more wiper arms are provided according to a size of the windshield, and when a plurality of wiper arms are provided, the plurality of wiper arms are provided so that the rotations thereof are not interfered with each other.

In addition, the wiper blade is detachably coupled to an end of the wiper arm through an adapter. The wiper blade is provided in a straight shape and slides and wipes a surface of the windshield by the movement of the rotating wiper arm while maintaining a state of being in close contact with the windshield.

Such a wiper blade is continuously rubbing the windshield in a state of being installed in a vehicle and thus may be worn over a period of use, may generate unnecessary noise, or may degrade surface wiping performance. Therefore, the wiper blade needs periodic replacement. In this case, the user of the vehicle separates a current wiper blade from the wiper arm and then fastens a new wiper blade thereto, and in this case, an adapter having a detachable structure is used between the wiper arm and the wiper blade.

The adapter has various shapes depending on the type of wiper arm, and recently, since a type of wiper arm in which a nozzle for spraying a washing liquid to wash the windshield is integrated into the wiper arm is used, the development for the adapter that may be efficiently detached from such the type of wiper arm is urgently required.

SUMMARY

The present disclosure is directed to providing a wiper connector, a wiper blade assembly, and a wiper device, which are provided with an adapter capable of being easily detached from a wiper arm equipped with a nozzle for spraying a washing liquid, thereby significantly increasing a user's convenience.

A wiper connector for mutually connecting a wiper blade and a wiper arm according to one aspect of the present disclosure includes an insertion portion inserted into the wiper arm and disposed at one side of a washing liquid spray nozzle provided on the wiper arm, and a fixing portion integrally provided with the insertion portion and fixed to the wiper blade, wherein the insertion portion includes a first fastener caught by a hole provided in an upper surface of the wiper arm, and a second fastener caught by a rib provided inside the wiper arm, and the second fastener is provided to be elastically deformed and provided to be switched from a first state in which the first fastener is elastically deformed by the rib when passing through the hole to a second state in which the first fastener passes the rib and is restored to an original state when being caught by the hole.

The first fastener may have a hook shape in which an upper end has relatively greater area than a lower end and may be switched between the first state in which the upper end passes through the hole and the second state in which the lower end moves in the hole and at least a part of the upper end is misaligned with the hole.

In the second state, the upper end of the first fastener may face the upper surface of the wiper arm to limit movement of the wiper arm in a height direction.

The second fastener may have a cantilever shape, and have a pressing portion that induces deformation of the wiper arm in a width direction while pressed by the rib, and a button portion that integrally moves with the pressing portion and has at least a part exposed to the outside.

In the second state, the pressing portion may face the rib in a longitudinal direction of the wiper arm to limit movement of the wiper arm in the longitudinal direction.

One surface of the pressing portion facing the rib may have an inclined surface or curved surface shape.

The second fastener may be switched from the second state to a third state in which when the button portion is deformed by an external force, the pressing portion is misaligned with the rib to allow the movement in a longitudinal direction.

A wiper blade assembly according to another aspect of the present disclosure includes the wiper connector, and a wiper blade connected to the wiper connector and being in close contact with a surface of a close contact target to slide along the surface, wherein the wiper connector further includes a base portion provided on the wiper blade, and the fixing portion is rotatably connected to the base portion.

A wiper device according to still another aspect of the present disclosure includes the wiper blade assembly, and the wiper arm seated on the wiper connector.

A pair of washing liquid spray nozzles may be provided in parallel to each face an end of the wiper arm, and the insertion portion may be disposed between the pair of washing liquid spray nozzles.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a partially exploded side view of the wiper device according to one embodiment of the present disclosure;

DETAILED DESCRIPTION

Figure 1:
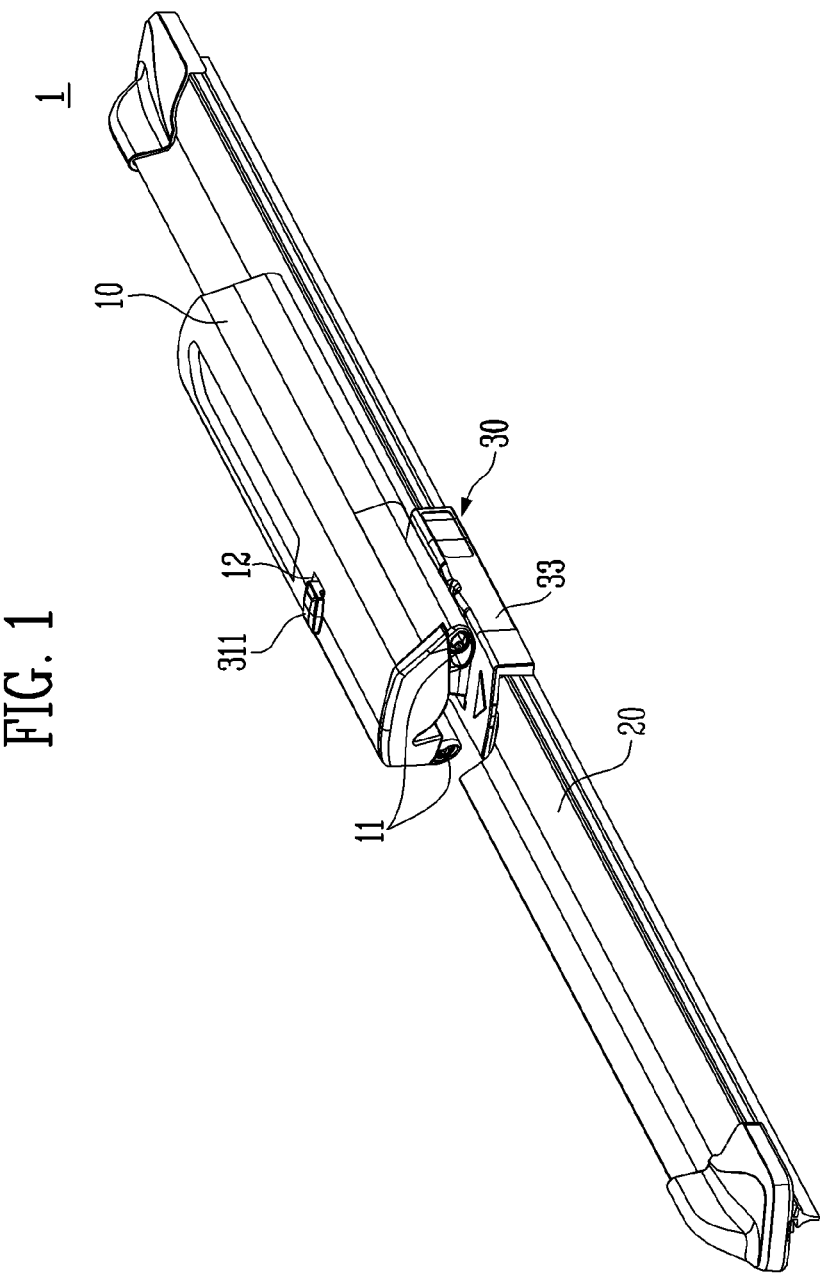
FIG. 1 is a perspective view of a wiper device according to one embodiment of the present disclosure.

Objects, specific advantages, and novel features of the present disclosure will become more apparent from the following detailed description and exemplary embodiments taken in conjunction with the accompanying drawings. In adding reference numerals to components of each drawing in the specification, it should be noted that the same components have the same numbers as much as possible even when the same components are shown in different drawings. In addition, in describing the present disclosure, when it is determined that a detailed description of related known technologies may unnecessarily obscure the gist of the present disclosure, a detailed description thereof will be omitted.

Hereinafter, a wiper connector, a wiper blade assembly, and a wiper device according to the present disclosure will be described with reference to the accompanying drawings.

Figure 2:
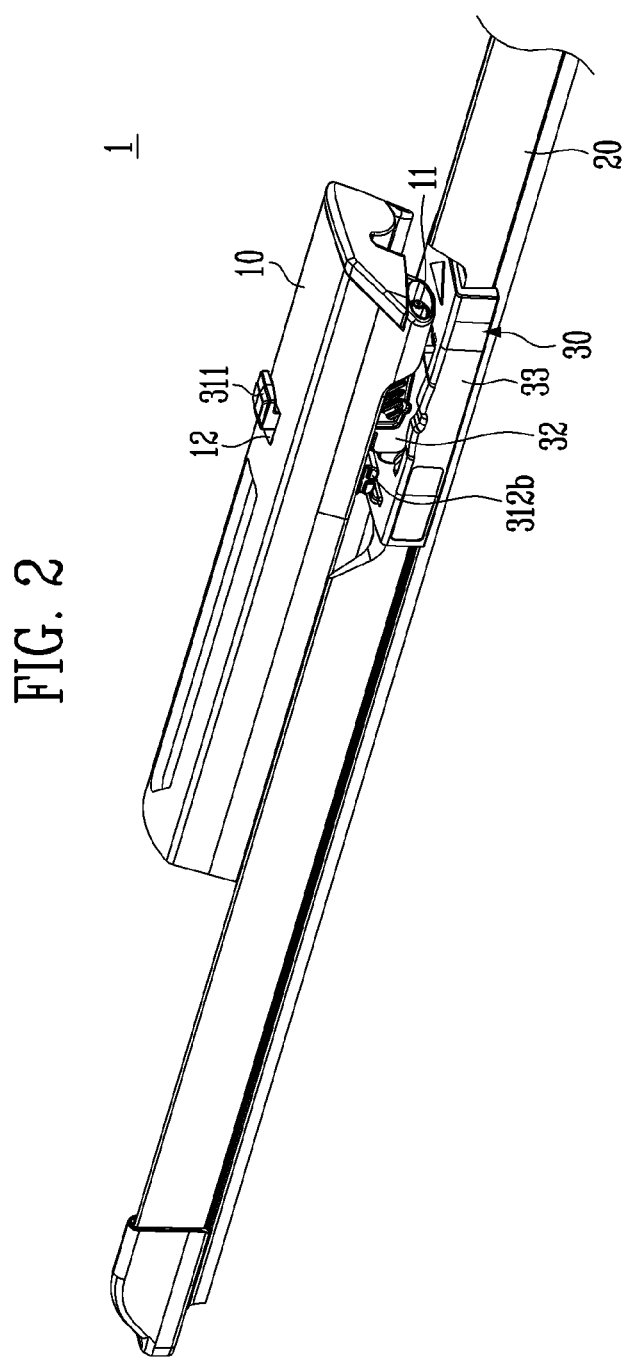
FIG. 2 is a perspective view of the wiper device according to one embodiment of the present disclosure.
Figure 3:
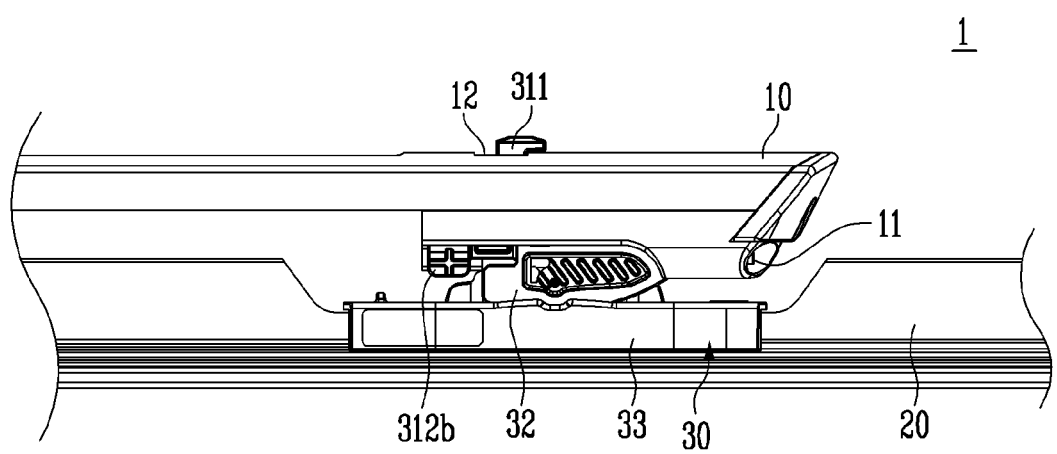
FIG. 3 is a side view of the wiper device according to one embodiment of the present disclosure.
Figure 4:
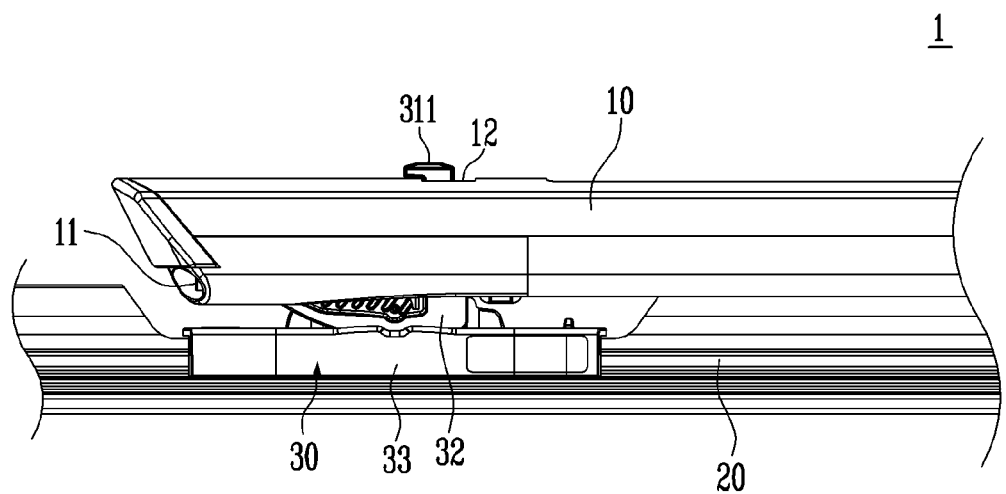
FIG. 4 is a side view of the wiper device according to one embodiment of the present disclosure.
Figure 5:
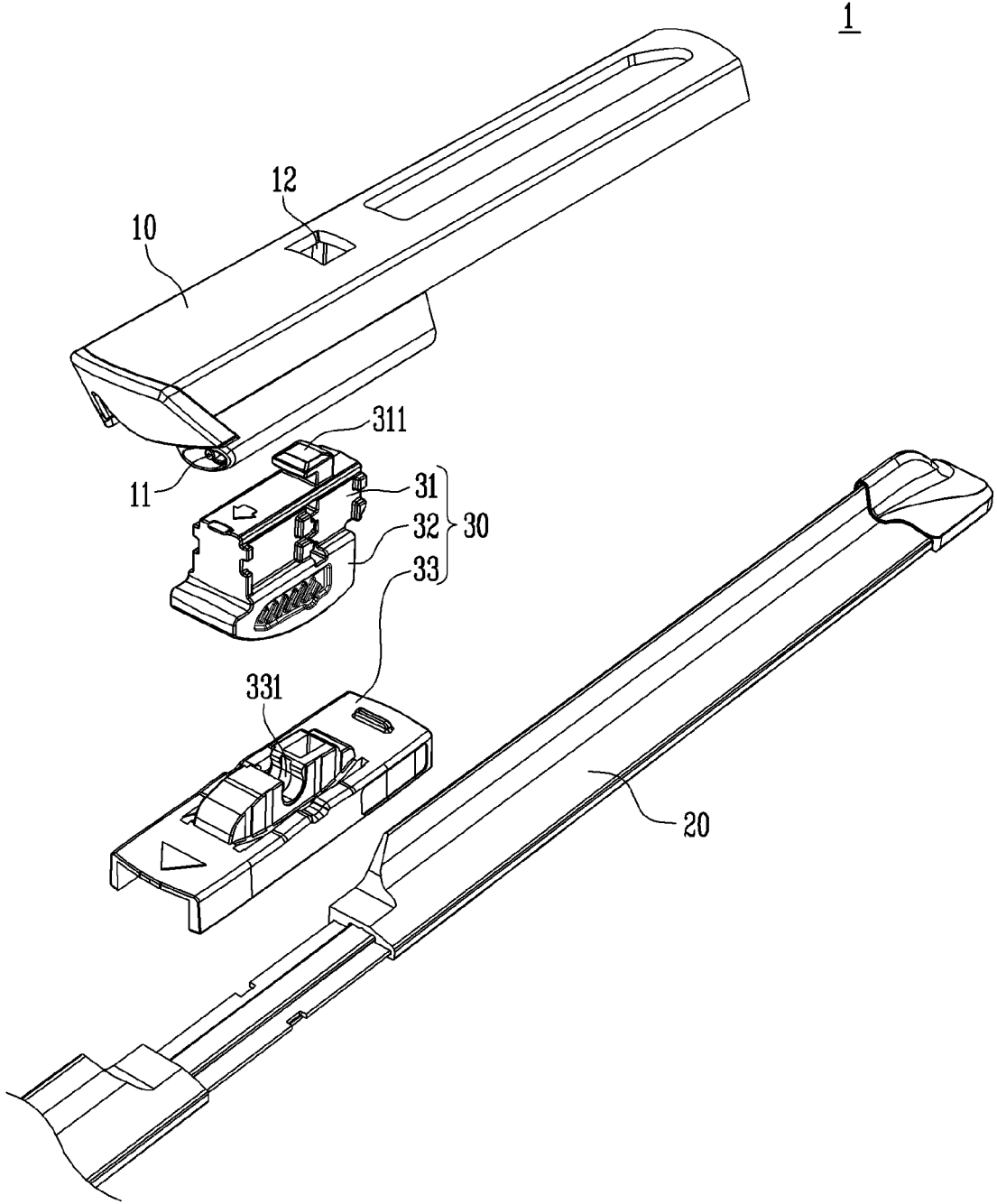
FIG. 5 is an exploded perspective view of the wiper device according to one embodiment of the present disclosure.
Figure 6:
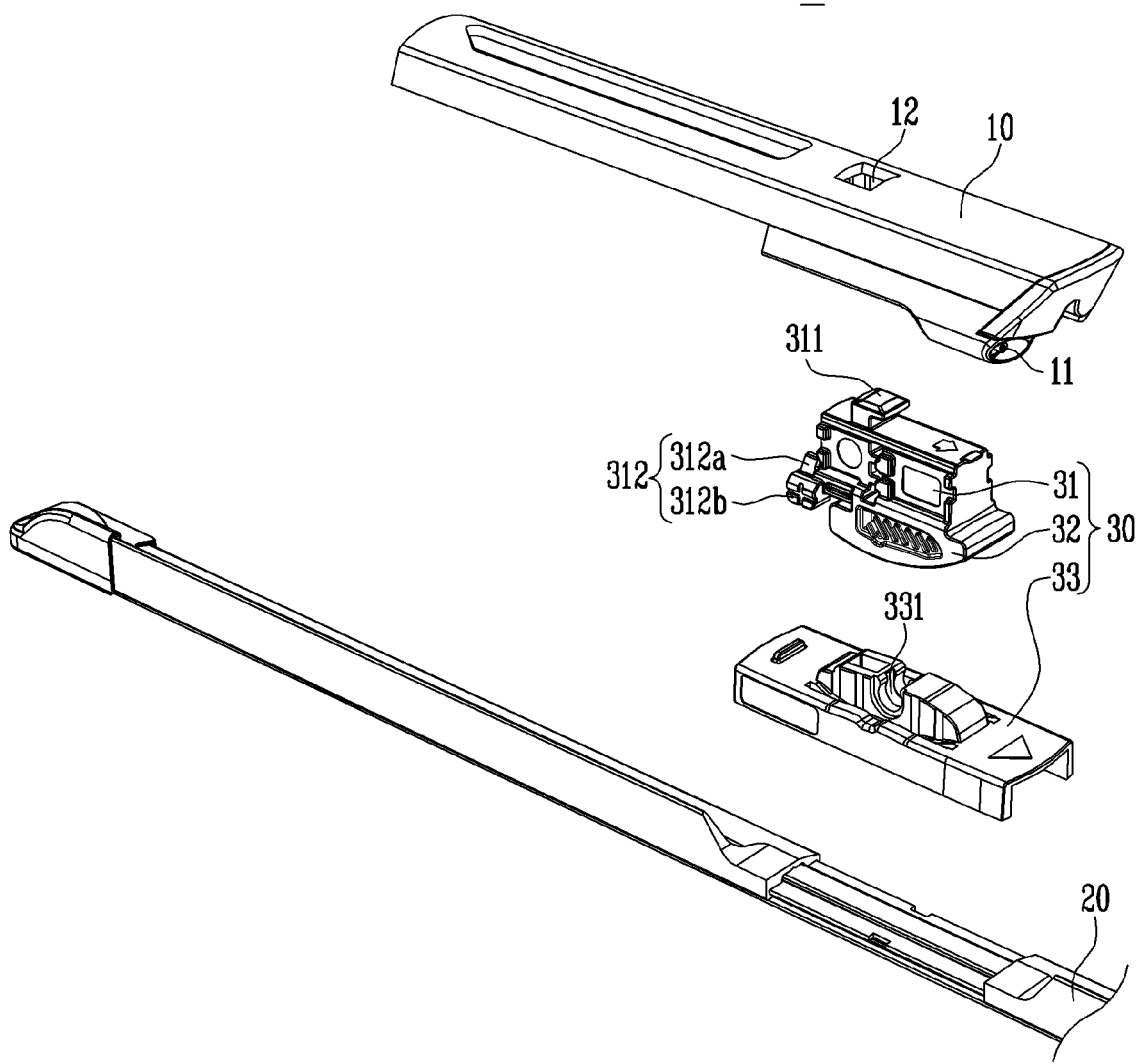
FIG. 6 is an exploded perspective view of the wiper device according to one embodiment of the present disclosure.

FIGS. 1 and 2 are perspective views of a wiper device according to one embodiment of the present disclosure, FIGS. 3 and 4 are side views of the wiper device according to one embodiment of the present disclosure, and FIGS. 5 and 6 are exploded perspective views of the wiper device according to one embodiment of the present disclosure.

Figure 7:
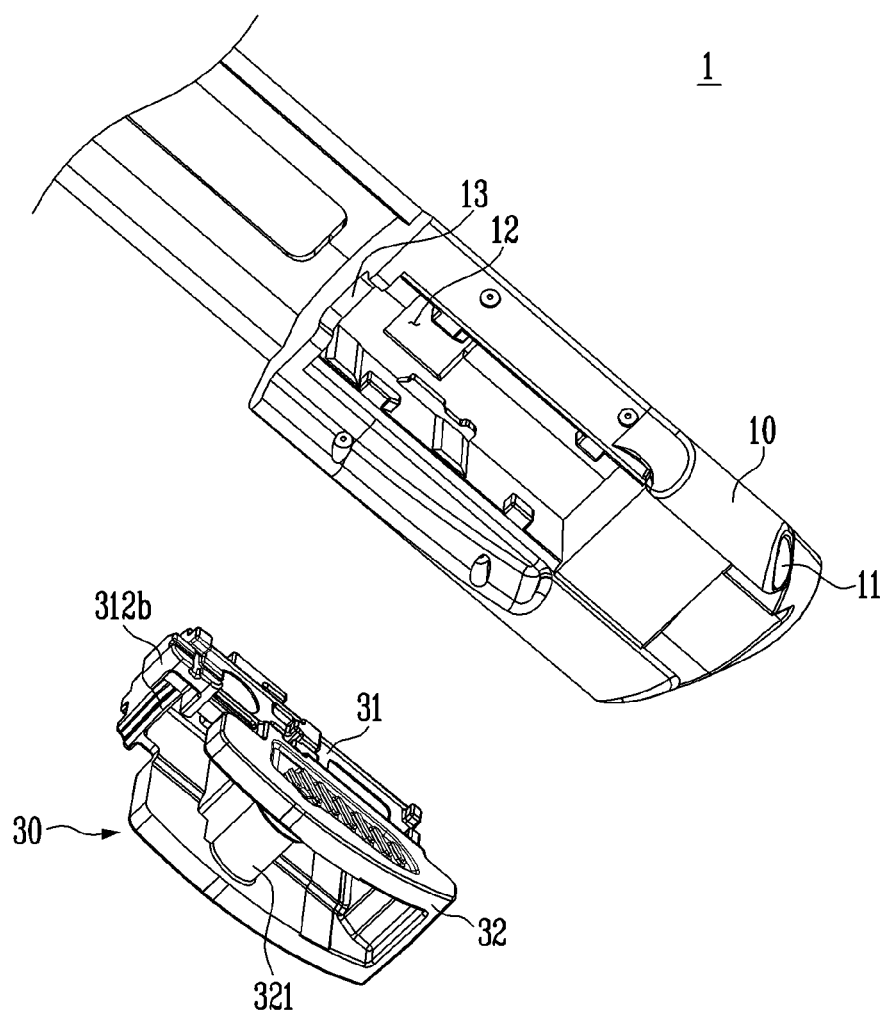
FIG. 7 is a partially exploded perspective view of the wiper device according to one embodiment of the present disclosure.
Figure 9:
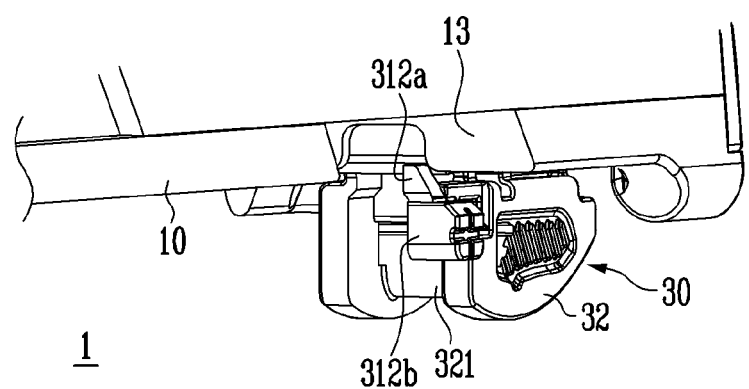
FIG. 9 is a partial perspective view of the wiper device according to one embodiment of the present disclosure.

In addition, FIG. 7 is a partially exploded perspective view of the wiper device according to one embodiment of the present disclosure, FIG. 8 is a partially exploded side view of the wiper device according to one embodiment of the present disclosure, and FIG. 9 is a partial perspective view of the wiper device according to one embodiment of the present disclosure.

Figure 10:
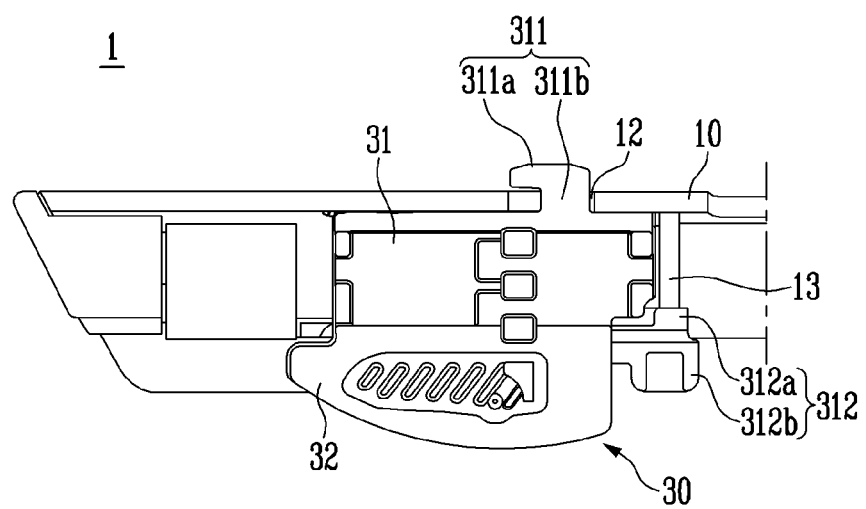
FIG. 10 is a partial side cross-sectional view of the wiper device according to one embodiment of the present disclosure.
Figure 11:
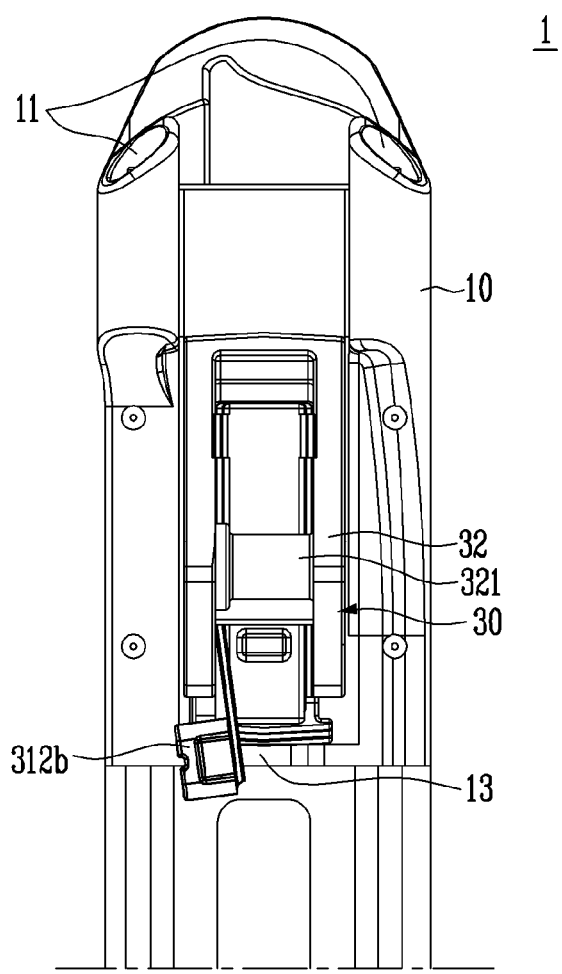
FIG. 11 is a partial bottom view of the wiper device according to one embodiment of the present disclosure.
Figure 12:
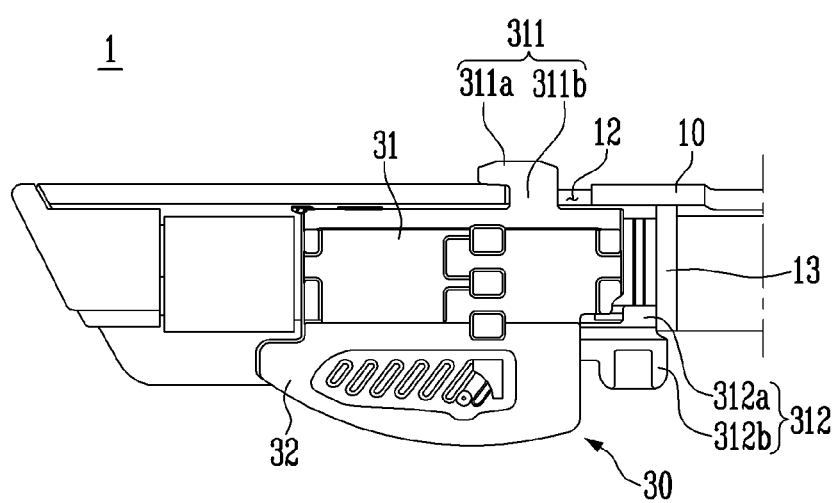
FIG. 12 is a partial side cross-sectional view of the wiper device according to one embodiment of the present disclosure.
Figure 13:
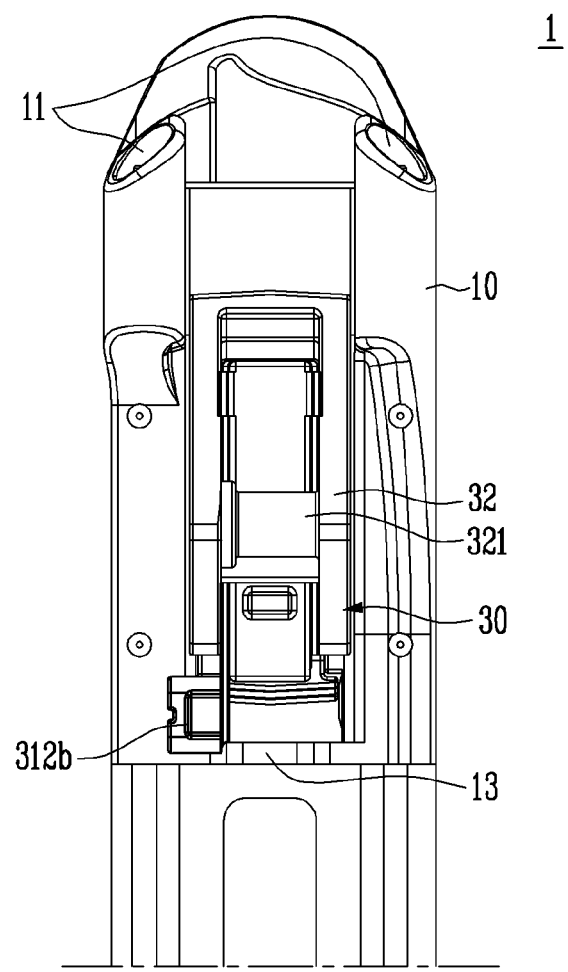
FIG. 13 is a partial bottom view of the wiper device according to one embodiment of the present disclosure.
Figure 14:
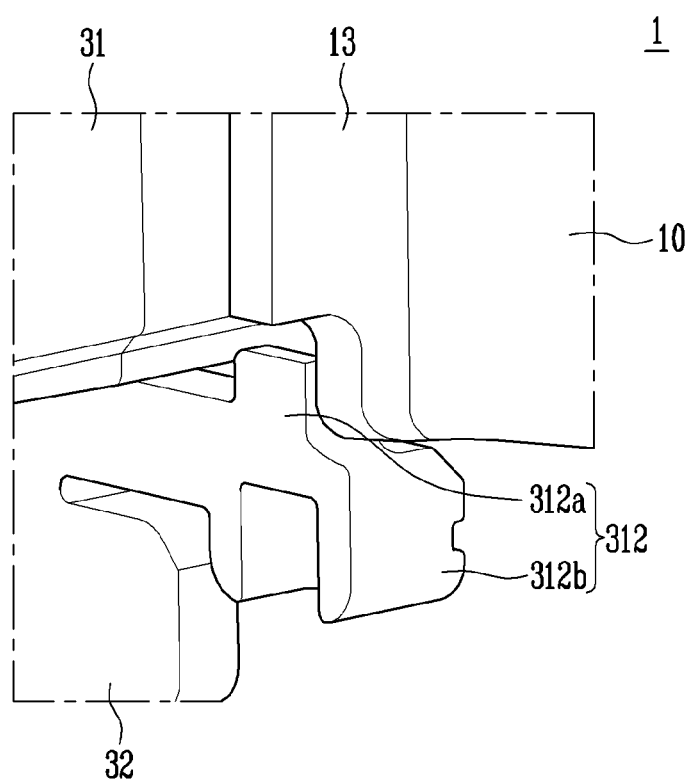
FIG. 14 is a partial perspective view of the wiper device according to one embodiment of the present disclosure.

In addition, FIG. 10 is a partial side cross-sectional view of the wiper device according to one embodiment of the present disclosure, FIG. 11 is a partial bottom view of the wiper device according to one embodiment of the present disclosure, FIG. 12 is a partial side cross-sectional view of the wiper device according to one embodiment of the present disclosure, and FIG. 13 is a partial bottom view of the wiper device according to one embodiment of the present disclosure. In addition, FIG. 14 is a partial perspective view of the wiper device according to one embodiment of the present disclosure.

In this case, FIGS. 1 to 4 are views showing a second state to be described below, FIGS. 7 to 9 are views showing a zeroth state to be described below, and FIGS. 10 and 11 are views showing a first state to be described below. In addition, FIGS. 12 to 14 are also views showing the second state.

For reference, in the specification, a longitudinal direction is a direction in which a wiper blade 20 or a wiper arm 10 extends, and may be a left-right direction based on FIG. 3. In addition, a width direction may be a direction perpendicular to the longitudinal direction. In addition, a height direction may be a direction away from a close contact target with which the wiper blade 20 is in close contact and may be a vertical direction based on FIG. 3. Of course, it should be noted that the above directions do not limit the scope of the present disclosure, but are merely for convenience in the description of the present disclosure.

In addition, movement or motion described in the specification is relative, and components other than moving targets may not necessarily be construed as sticking to a fixed position. Furthermore, in the specification, expressions, such as connecting, fastening, engaging, and fixing, in addition to direct action between two components, include indirect action between the two components with other components therebetween.

Referring to FIGS. 1 to 14, a wiper device 1 according to one embodiment of the present disclosure includes a wiper arm 10, a wiper blade 20, and a wiper connector 30.

In the present disclosure, the wiper arm 10, the wiper blade 20, the wiper connector 30, etc. may be collectively referred to as the wiper device 1, and in the wiper device 1, the components (the wiper blade 20 and the wiper connector 30) other than the wiper arm 10 and the like may be referred to as an assembly of a wiper blade 20. In other words, the wiper device 1 may be formed in a form in which the wiper arm 10 is connected to the assembly of the wiper blade 20.

The wiper arm 10 has a base end to be rotatably connected and an end to which the wiper blade 20 is connected. The wiper arm 10 is implemented to transmit a rotational force to the wiper blade 20 connected to the end while rotating about the base end so that the wiper blade 20 cleans a close contact target.

In the present disclosure, the close contact target may be a windshield of a vehicle, but is not limited thereto, and any object that can be cleaned by sliding may be the close contact target. However, the following description will be made assuming that the close contact target is the windshield for convenience.

The wiper arm 10 is directly or indirectly connected to a driving source (motor or the like) provided in the vehicle or the like and has the end that rotates along an arc by a rotational force of the driving source. At this time, since the wiper blade 20 is connected to the end of the wiper arm 10, the wiper blade 20 may implement cleaning while moving along a predetermined path in a state of being in close contact with the close contact target.

The wiper arm 10 has a washing liquid spray nozzle 11. In the conventional case, the washing liquid is sprayed through the nozzle disposed to be spaced apart from the wiper arm 10, but in the present disclosure, by integrating the washing liquid spray nozzle 11 into the wiper arm 10, it is possible to efficiently supply the washing liquid to a portion to be swept with the wiper blade 20.

To this end, the washing liquid spray nozzle 11 may be embedded in the wiper arm 10 to face the wiper blade 20 or the close contact target. The washing liquid spray nozzle 11 may be connected to a washing liquid supply source (not shown) through a washing liquid supply tube (not shown), and the washing liquid may be sprayed through the washing liquid spray nozzle 11 at a constant pressure by performing a separate operation.

In the embodiment, a pair of washing liquid spray nozzles 11 may be provided and disposed in parallel at both sides at a front end of the wiper arm 10. Therefore, since the washing liquid may be sprayed at start and end points of a sweep direction of the wiper blade 20, it is possible to further increase a washing force for the close contact target.

The wiper connector 30 to be described below may be inserted into a space between the pair of washing liquid spray nozzles 11 provided on the wiper arm 10. In other words, the washing liquid spray nozzle 11 is provided not to interfere with the wiper connector 30 when embedded in the wiper arm 10.

The wiper arm 10 may have various unlimited shapes, and a shape of the wiper connector 30 may be freely changed to correspond to the shape of the wiper arm 10. Of course, the wiper connector 30 may also be provided in a multi-fastening type in which a plurality of wiper arms 10 having different shapes may be selectively coupled.

However, the wiper arm 10 in the embodiment may have a hole 12 provided in an upper surface thereof to be coupled with the wiper connector 30. The hole 12 is configured to fasten a first fastener 311 of the wiper connector 30 to be described below and has a larger planar cross-section than the first fastener 311 so that the first fastener 311 may pass therethrough and a form in which a part of the first fastener 311 is movable in the longitudinal direction.

As will be described again below, the first fastener 311 may pass through the hole 12 of the wiper arm 10, and the first fastener 311 may move in the longitudinal direction in the state of passing through the hole 12 of the wiper arm 10. In other words, the first fastener 311 has a "]"-shaped cross section and couples the wiper arm 10 and the wiper connector 30 by moving in the longitudinal direction in the state of passing through a certain portion of the hole 12 of the wiper arm 10 and being caught by the hole 12 of the wiper arm 10.

In this case, the hole 12 of the wiper arm 10 and the first fastener 311 are implemented for fixing in the height direction and the width direction, and fixing in the longitudinal direction is implemented using a second fastener 312 to be described below.

The wiper arm 10 includes a rib 13 therein for fastening of the second fastener 312. The rib 13 is provided inside the wiper arm 10 and has a shape protruding from an inner surface of the wiper arm 10 in the width direction.

The rib 13 is provided to interfere with the second fastener 312 when the first fastener 311 of the wiper connector 30 is vertically disposed side by side in the hole 12 of the wiper arm 10. This case means that the first fastener 311 may pass through the hole 12.

In addition, the rib 13 is provided not to interfere with the second fastener 312 in the state in which the first fastener 311 of the wiper connector 30 is fastened to the hole 12 of the wiper arm 10. However, this will be described in detail below.

The rib 13 of the wiper arm 10 is configured to elastically deform the second fastener 312 while pressing a pressing portion 312a provided on the second fastener 312, and an inclined surface or a curved surface may be applied to at least one side of a portion in which the second fastener 312 and the rib 13 are in contact with each other. Although the drawings show that the rib 13 has a planar surface and the pressing portion 312a has an inclined surface, the rib 13 may have an inclined surface and the pressing portion 312a may have a planar surface, or both the rib 13 and the pressing portion 312a may have inclined surfaces.

In addition, the rib 13 may be provided to have a partition wall shape in the width direction inside the wiper arm 10 and may serve to reinforce the structural strength of the wiper arm 10. In this case, since the rib 13 has a shape in which at least a portion is recessed upward, the second fastener 312 may be elastically deformed through the recessed portion of the rib 13.

The wiper blade 20 is in close contact with a surface of the close contact target and cleans the surface of the close contact target by movement. At this time, as described above, the close contact target may be any object to be cleaned by sliding, such as a windshield of a vehicle.

The wiper blade 20 may include a close contact member (not shown), an elastic member (not shown), a cover member (not shown), and a finishing cover (not shown).

The close contact member is in direct close contact with the surface of the close contact target and slides along the surface. The close contact member may have a shape in which a close contact side is different from the surface of the close contact target in a state in which an external force is not applied thereto and then may be deformed into a shape in which the close contact side is naturally consistent with the surface of the close contact target while being pressed toward the close contact target when the wiper blade 20 is coupled to the wiper arm 10 through the wiper connector 30.

The elastic member is made of a metal material and embedded inside the wiper blade 20 to apply an elastic force to the close contact member. The elastic member may be provided as a plate spring or the like and give an elastic force, which allows the close contact member to return to a more curved shape than the surface of the close contact target, to the close contact member. Therefore, when the close contact member is pressed to the close contact target by the wiper arm 10, the close contact side of the close contact member is deformed and applies a force to push the close contact target, but the close contact side may be firmly in close contact with the close contact target while maintaining the state of being pressed by the wiper arm 10.

The cover member is provided at a side opposite to the close contact member and has an A-shaped or mountain-shaped cross-section at the top, thereby preventing the wiper blade 20 from being lifted by wind while a vehicle travels.

The finishing cover (not shown) may be provided to finish both ends of the cover member and the close contact member and isolate the elastic member from the outside. A pair of finishing covers may be provided at both ends of the wiper blade 20 in the longitudinal direction, but the finishing covers may be omitted depending on the shape of the cover member.

As shown in FIG. 1 and the like, the wiper arm 10 may be connected to a central portion of the wiper blade 20 in the longitudinal direction. To this end, the wiper connector 30 is seated on the central portion of the wiper blade 20 in the longitudinal direction.

For example, a base portion 33 of the wiper connector 30 to be described below may be coupled to the wiper blade 20, and in a coupling method between the wiper connector 30 and the wiper blade 20, protrusion engagement, rivet, bolting, etc. may be used.

However, in order to connect the wiper connector 30 to the central portion of the wiper blade 20, as shown in FIGS. 5 and 6, a pair of cover members or the like may have a shape in which the pair of cover members are spaced apart from each other with respect to the center of the wiper blade 20.

The wiper connector 30 is for mutually fastening the wiper blade 20 and the wiper arm 10 and may be referred to as an adapter.

However, the wiper connector 30 does not only have a shape completely separable from the wiper blade 20, the wiper arm 10, etc. and may be formed by a part of the wiper blade 20, or may also be formed in a shape in which at least a portion is integrated into the wiper blade 20 or the wiper arm 10. However, hereinafter, in the specification, for convenience, the wiper connector 30 will be described as a separate component provided independently of the wiper blade 20 and the wiper arm 10.

Referring primarily to FIGS. 5 to 8 and the like, the wiper connector 30 includes an insertion portion 31, a fixing portion 32, and the base portion 33.

The insertion portion 31 is inserted into the wiper arm 10 and disposed at one side of the washing liquid spray nozzle 11 provided on the wiper arm 10. As described above, the pair of washing liquid spray nozzles 11 may be provided on the wiper arm 10, and the insertion portion 31 may be disposed between the pair of washing liquid spray nozzles 11.

At least a part of the insertion portion 31 is inserted into the wiper arm 10 and fixed to the wiper arm 10, and a part of a lower portion of the insertion portion 31 may be exposed to the outside of the wiper arm 10. In particular, a part of the second fastener 312 provided on the insertion portion 31 is exposed to the outside.

The insertion portion 31 has the first fastener 311 and the second fastener 312 to be fixed to the wiper arm 10. The first fastener 311 restricts movement between the wiper connector 30 and the wiper arm 10 in the height direction and the width direction.

For example, the first fastener 311 is caught by the hole 12 provided in an upper surface of the wiper arm 10. As described above, the hole 12 having a size that the first fastener 311 can pass through may be provided in the upper surface of the wiper arm 10, and the first fastener 311 may be switched to enter a second state of being caught by the hole 12 from a first state of passing through the hole 12.

Specifically, the first fastener 311 is provided to have a lower end 311b and an upper end 311a and has a hook shape (e.g., a "¬" shape) in which the upper end 311a has a relatively larger area than the lower end 311b. In this case, the area of the upper end 311a of the first fastener 311 is smaller than the area of the hole 12 so that the first fastener 311 passes through the hole 12 of the wiper arm 10.

The first fastener 311 is switched between the first state in which the upper end 311a passes through the hole 12 and the second state in which the lower end 311b moves in the hole 12 so that at least a part of the upper end 311a is misaligned with the hole 12. In the first state, since the upper end 311a of the first fastener 311 is disposed to pass through the hole 12 in the height direction, the movement of the first fastener 311 in the width direction with respect to the wiper arm 10 is restricted, but the movement thereof in the height direction may not be restricted.

On the other hand, when the first fastener 311 is in the second state, a part of the upper end 311a of the first fastener 311 is misaligned with the hole 12 to face the close upper surface of the wiper arm 10, and thus the first fastener 311 may not move downward from the hole 12. In addition, since the upper surface of the insertion portion 31 faces the surrounding of the hole 12, the first fastener 311 may not move upward from the hole 12. Therefore, the first fastener 311 restricts the movement of the wiper arm 10 in the width direction and the longitudinal direction in the second state.

The switching of the first fastener 311 between the first state and the second state, as described above, will be described again below with reference to FIGS. 10 to 14. However, in the specification, the state of FIGS. 7 to 9 in which the first fastener 311 is disposed just under the hole 12 and which is a state before the first fastener 311 passes through the hole 12 may be defined as a zeroth state.

The second fastener 312 is caught by the rib 13 provided inside the wiper arm 10. The second fastener 312 is provided in an elastically deformable form and is in the first state of being elastically deformed by being pressed by the rib 13 when the first fastener 311 passes through the hole 12.

Then, when the first fastener 311 is caught by the hole 12 of the wiper arm 10 by the relative movement of the wiper connector 30 and the wiper arm 10 in the longitudinal direction, the second fastener 312 passes the rib 13 and is restored to an original state by the elastic force, and at this time, the second fastener 312 enters the second state of restricting the movement of the wiper arm 10 in the longitudinal direction.

However, the second fastener 312 may limit the retract of the wiper arm 10 in the longitudinal direction with respect to the wiper connector 30 while facing the rib 13 at a rear side thereof, and the advance of the wiper arm 10 in the longitudinal direction with respect to the wiper connector 30 may be limited by the insertion portion 31 itself and an inner structure of the wiper arm 10 in contact with each other.

Of course, unlike this, one or more ribs 13 may be provided on the wiper arm 10, and the rib 13 is additionally disposed in front of the second fastener 312 in the second state in the longitudinal direction so that the front-rear movement of the wiper arm 10 in the longitudinal direction may be all restricted by only the second fastener 312. However, in this case, the insertion portion 31 has a shape that does not interfere with the rib 13 when moving upward to the wiper arm 10 to pass the first fastener 311 through the hole 12.

Specifically, the second fastener 312 has a cantilever shape and includes the pressing portion 312a, a button portion 312b, etc. The pressing portion 312a is disposed above the second fastener 312 having the cantilever shape adjacent to the wiper arm 10 and induces the deformation of the wiper arm 10 inward in the width direction with respect to the second fastener 312 while being pressed by the rib 13 of the wiper arm 10 when the wiper connector 30 and the wiper arm 10 are fastened to each other.

In order to perform the induction more smoothly, as described above, one surface of the pressing portion 312a facing the rib 13 may have an inclined surface or curved surface shape. However, the pressing portion 312a is in contact with or faces the rib 13 in the second state to limit the movement of the wiper arm 10 in the longitudinal direction, and a thickness of the pressing portion 312a in the width direction may be sufficiently determined in consideration of the fastening force of the wiper arm 10.

The button portion 312b is disposed at a lower portion of the second fastener 312 having the cantilever shape that is far from the wiper arm 10 and moves integrally with the pressing portion 312a. The button portion 312b may have at least a part exposed to the outside and may be pressed by a user.

To this end, the button portion 312b may be sufficiently exposed to be easily pressed by the user, and an uneven structure may also be applied to the surface to enhance the user's pressing convenience. In other words, as shown in FIGS. 8 and 9 and the like, a recess structure may be applied to an exposed surface of the button portion 312b, and unevenness may be given thereto. Alternatively, unlike in the drawings, friction protrusion may also be added.

The button portion 312b may have an area that may be sufficiently pressed by at least one fingertip, but has a form in a range in which the hinge movement of the fixing portion 32 and the base portion 33 is not interfered with the button portion 312b. In addition, the button portion 312b may have an outstanding color when compared to the wiper arm 10 or the insertion portion 31, and thus when the user separates the wiper arm 10 from the wiper connector 30, the user can easily find the button portion 312b.

The button portion 312b is deformed inward in the width direction of the wiper arm 10 by an external force. In other words, the direction in which the pressing portion 312a is deformed by being pressed by the rib 13 and the direction in which the button portion 312b is deformed by being pressed by the external force are the same.

However, a case in which the pressing portion 312a is pressed is the first state and is to be switched to the second state, and a case in which the button portion 312b is pressed is the second state and is to be switched to a third state to be described below.

In other words, in the second state in which the first fastener 311 is caught by the hole 12 of the wiper arm 10 to restrict the movement of the wiper arm 10 in the height and width directions and the pressing portion 312a of the second fastener 312 faces the rib 13 to restrict the movement of the wiper arm 10 in the longitudinal direction, when the button portion 312b of the second fastener 312 is sufficiently deformed by the external force, the pressing portion 312a is separated to be misaligned in the longitudinal direction of the rib 13.

At this time, since the pressing portion 312a does not face the rib 13 in the longitudinal direction and the first fastener 311 may not limit the movement in the longitudinal direction in the hole 12 (especially backward movement), the wiper connector is disposed to be movable backward from the wiper arm 10.

As described above, a state in which in the second state, the pressing portion 312a is misaligned with the rib 13 as the button portion 312b is pressed, and thus the second fastener 312 is movably disposed in the longitudinal direction with respect to the wiper arm is defined as the third state. In other words, when the button portion 312b is pressed by the external force, the switching from the second state to the third state may be made.

The fixing portion 32 is integrally provided with the insertion portion 31 and fixed to the wiper blade 20. The fixing portion 32 may be provided under the insertion portion 31 and manufactured separately and then connected to the insertion portion 31 or integrally manufactured with the insertion portion 31.

The fixing portion 32 may be integrated with the insertion portion 31 in a shape in which a point structurally separated from the insertion portion 31 is not clearly partitioned, but a portion under the second fastener 312 having the cantilever shape may be defined as the fixing portion 32.

The fixing portion 32 may be directly or indirectly connected to the wiper blade 20, and in the embodiment, the fixing portion 32 may be indirectly connected to the wiper blade 20 through the base portion 33 fastened to the wiper blade 20.

In addition, the fixing portion 32 may be provided to be hinge-rotated with respect to the wiper blade 20, and to this end, a rotational shaft 321 is provided on the fixing portion 32. The rotational shaft 321 may have a bar shape extending from the fixing portion 32 in the width direction or have at least a pair of protrusion shapes capable of implementing a stable hinge rotation on the base portion 33.

The fixing portion 32 may be rotatably provided with the wiper blade 20 in the longitudinal direction using the rotational shaft 321, and therefore, even when an angle between the wiper arm 10 and the close contact target is changed, the wiper blade 20 can be in stable close contact with the close contact target.

The base portion 33 is provided on the wiper blade 20. The base portion 33 may be provided at the central point of the wiper blade 20 in the longitudinal direction and fastened to the close contact member, the cover member, etc. of the wiper blade 20.

For example, a pair of cover members of the wiper blade 20 may be divided with respect to the central portion of the wiper blade 20 in the longitudinal direction, and the base portion 33 may be fixedly seated in a space between the pair of cover members.

A rotation groove 331 is provided in the base portion 33. The rotation groove 331 of the base portion 33 accommodates the rotational shaft 321 provided on the fixing portion 32, but has a shape in which the rotational shaft 321 is not easily separated. In other words, an open top of the rotation groove 331 may be formed in a shape having a smaller diameter than a diameter of the rotational shaft 321 of the base portion 33.

In this case, since the rotational shaft 321 of the fixing portion 32 is forcibly fitted into the rotation groove 331 of the base portion 33, the coupling between the base portion 33 and the fixing portion 32 is maintained unless a predetermined external force is applied. In addition, since the fixing portion 32 is rotatably connected to the base portion 33, the hinge rotation between the wiper blade 20 and the wiper arm 10 is implemented.

Of course, the rotational shaft 321 and the rotation groove 331 may also be disposed in an opposite way. That is, the rotation groove 331 may be provided in the fixing portion 32, and the rotational shaft 321 may also be provided on the base portion 33. In addition, as necessary, the wiper connector 30 may also be fastened to the wiper blade 20 without hinge rotation, and in this case, the base portion 33 may be omitted, and the fixing portion 32 may also be directly coupled to the wiper blade 20. In this case, the fixing portion 32 may have a structure that is detachably coupled to the wiper blade 20 or the fixing portion 32 may be integrated with the wiper blade 20, and thus the wiper blade 20 and the wiper connector 30 may be integrally provided.

Hereinafter, the fastening and separating operation of the wiper connector 30 will be described with reference back to the drawings. For reference, the drawings correspond to each state as follows.

Zeroth state: FIGS. 7 to 9
First state: FIGS. 10 to 11
Second state: FIGS. 12 to 14

First, referring to FIGS. 5 and 6, the base portion 33 may be separated from the wiper blade 20, and the base portion 33 and the wiper blade 20 may be assembled in a manufacturing process rather than user work. In other words, the base portion 33 may be integrated with the wiper blade 20 at the time of manufacture.

The fastening of the wiper connector 30 may be started in the state of FIGS. 7 and 8. However, FIGS. 7 and 8 show the wiper connector 30 in which the base portion 33 is omitted, but the starting step in which the user couples the wiper connector 30 to the wiper arm 10 will be described assuming as being a state in which the base portion 33 is already fastened on the wiper blade 20, and the base portion 33 and the fixing portion 32 are interconnected so that the wiper connector 30 is connected to the wiper blade 20.

Referring to FIGS. 7 and 8, the wiper connector 30 is disposed under the wiper arm 10 in the height direction. In this case, as shown in FIG. 8, the upper end 311a of the first fastener 311 is provided just under the hole 12 provided in the upper surface of the wiper arm 10.

In the embodiment, such a state may be defined as the zeroth state. In other words, the zeroth state is a state in which the wiper arm 10 and the wiper connector 30 are vertically disposed in a column and the fastening to the first fastener 311 is prepared.

Referring to FIG. 9, the wiper connector 30 is disposed adjacent to the wiper arm 10 when compared to FIGS. 7 and 8. This state is that the wiper connector 30 moves toward the wiper arm 10 when compared to FIG. 7 and the like, but may still be defined as the zeroth state.

Referring to the zeroth state shown in FIG. 9, the pressing portion 312a of the second fastener 312 is in contact with the rib 13. In other words, in the embodiment, states from the state of the wiper arm 10 separated from the wiper connector 30 to the state of the second fastener 312 in contact with the rib 13 of the wiper arm 10 are collectively referred to as the zeroth state.

In FIG. 9, the rib 13 is in contact with the pressing portion 312a of the second fastener 312 with an inclined surface, and in this case, when a predetermined external force (an extent to which the rib 13 deforms the pressing portion 312a) is not applied, the wiper connector 30 is not inserted into the wiper arm 10.

Then, referring to FIGS. 10 and 11, the wiper connector 30 may be completely inserted into the wiper arm 10, and the first fastener 311 may pass through the hole 12 provided in the wiper arm 10. In this case, the upper end 311a of the first fastener 311 may pass through the hole 12, and the lower end 311b of the first fastener 311 is positioned in the hole 12.

On the other hand, the pressing portion 312a of the second fastener 312 is pressed by the rib 13. In other words, when the user relatively moves the wiper connector toward the wiper arm 10 in the zeroth state in FIG. 9, the rib 13 presses the inclined surface of the pressing portion 312a and thus the second fastener 312 is elastically deformed.

As shown in FIG. 11, a free end of the second fastener 312 having the cantilever shape is bent inward from the wiper arm 10 in the width direction, and in this case, the pressing portion 312a is misaligned inward from the rib 13 in the width direction.

In the embodiment, the above state is defined as the first state, and in the first state, the first fastener 311 is in a state of passing through the hole 12, but does not restrict the movement of the wiper arm 10 in the height direction and the longitudinal direction.

Then, referring to FIGS. 12 to 14, when the second fastener 312 is bent, the user moves the wiper connector 30 relatively with respect to the wiper arm 10 in the longitudinal direction. In this case, as shown in FIG. 12, the first fastener 311 is in contact with the upper surface of the wiper arm 10 while the upper end 311a is misaligned with the hole 12, and the lower end 311b is positioned adjacent to a front end of the hole 12. Therefore, the first fastener 311 may restrict the movement of the wiper arm 10 in the height direction and the width direction. However, since the first fastener 311 may not restrict the rightward movement of the wiper connector 30 based on the drawings, the first fastener 311 may be not seen as completely restricting the movement of the wiper arm 10 in the longitudinal direction.

In this case, the second fastener 312 restricts the movement of the wiper arm in the longitudinal direction. Specifically, the second fastener 312 is restored to the original state by the elastic force as the pressing portion 312a passes the rib 13 forward in the longitudinal direction. In this case, since the pressing portion 312a of the second fastener 312 is disposed to overlap the rib 13 in the longitudinal direction, and as can be seen in FIG. 14, the backward movement of the pressing portion 312a in the longitudinal direction is limited by the rib 13.

In addition, as shown in FIG. 12, since the front end of the insertion portion 31 of the wiper connector 30 is in contact with the inner structure of the wiper arm 10, the forward movement of the wiper connector 30 is restricted in the longitudinal direction with respect to the wiper arm 10.

Therefore, in the state of FIGS. 12 to 14, the movement of the wiper arm 10 in the longitudinal direction with respect to the wiper connector 30 is restricted by the insertion portion 31 itself and the second fastener 312, and in the embodiment, such a state is defined as the second state.

The second state is a state in which the wiper arm 10 is completely fastened to the wiper blade 20 by the wiper connector 30. Specifically, the movement of the wiper arm in the height direction and the width direction is restricted by the first fastener 311, and the movement of the wiper arm 10 in the longitudinal direction (backward movement) is restricted by the second fastener 312, and the movement of the wiper arm 10 in the longitudinal direction (advance) is restricted by the insertion portion 31.

Furthermore, the movement of the wiper arm 10 in the width direction may be additionally restricted by the insertion portion 31 inserted into the wiper arm 10. To this end, one or more protrusions (not shown), which allows the insertion portion 31 to face or be in contact with the inner surface of the wiper arm 10, may be provided on both side surfaces of the insertion portion 31.

As described above, the first fastener 311 may pass through the hole 12 of the wiper arm 10, and in the state of being inserted into the hole 12, the movement of the first fastener 311 in the width direction may be naturally restricted by the hole 12, and thus the first fastener 311 may structurally restrict the movement of the wiper arm 10 in the width direction.

However, considering that a predetermined tolerance may also be applied between the width of the hole 12 and the width of the first fastener 311 in order to allow the first fastener 311 to pass through the hole 12, in the embodiment, it is possible to mainly restrict the movement of the wiper arm 10 in the width direction by the shape of the insertion portion 31 itself and subsidiarily restrict the movement of the wiper arm 10 in the width direction by the first fastener 311.

To this end, in the embodiment, one or more (e.g., a front end, a rear end, a center, etc.) protrusions in the longitudinal direction and/or one or more protrusions in the height direction may be disposed to protrude from a side surface of the insertion portion 31. In this case, the protruding degree of the protrusion may be uniformly or non-uniformly determined depending on the shape of the inner surface of the wiper arm 10.

When the insertion portion 31 is positioned in the wiper arm 10, at least some of the plurality of protrusions may be in direct contact with the inner structure of the wiper arm 10, thereby not only sufficiently limiting the movement of the wiper arm 10 in the width direction but also effectively suppressing shaking.

Then, in order to separate the wiper arm 10, the user may press the button portion 312*b* of the second fastener 312. When the button portion 312*b* is pressed, the pressing portion 312*a* also moves inward in the width direction of the wiper arm 10, and thus the pressing portion 312*a* is misaligned with the rib 13 in the longitudinal direction. Therefore, the wiper connector 30 can move backward in the longitudinal direction with respect to the wiper arm 10.

In the embodiment, a state in which the pressing portion 312*a* is misaligned with the rib 13 when the button portion 312*b* of the second fastener 312 is pressed may be defined as the third state. In the third state, the user may retract the wiper connector 30 in the longitudinal direction with respect to the wiper arm 10, and when the wiper connector sufficiently moves backward, this returns to the first state in which the first fastener 311 may pass through the hole 12 of the wiper arm 10.

In the returned first state, the user may move the wiper connector 30 downward from the wiper arm 10, and thus the wiper arm 10 and the wiper blade 20 are separated.

As described above, in the embodiment, in the case of the wiper arm 10 having the washing liquid spray nozzle 11, the wiper connector 30 partially inserted into the wiper arm 10 is provided, and it is possible to not only simply couple the wiper arm 10 and the wiper connector 30, but also easily separate the wiper arm 10 from the wiper connector through the button operation, thereby maximizing the user's convenience.

According to a wiper connector, a wiper blade assembly, and a wiper device according to the present disclosure, it is possible to apply an adapter that is easily fastened to and separated from a wiper arm having a washing liquid spray nozzle by performing a simple operation, thereby securing fixing strength between the wiper arm and the adapter and easily disassembling the wiper arm from the adapter.

Although the present disclosure has been described above in detail through specific embodiments, this is for specifically describing the present disclosure, the present disclosure is not limited thereto, and it will be apparent that modifications or improvements by those skilled in the art are possible without departing from the technical spirit of the present disclosure.

All simple modifications or changes of the present disclosure fall within the scope of the present disclosure, and the specific scope of the present disclosure will be clarified by the appended claims.

What is claimed is:

1. A wiper connector for mutually connecting a wiper blade and a wiper arm, comprising:
    an insertion portion inserted into the wiper arm and disposed at one side of a washing liquid spray nozzle provided on the wiper arm; and
    a fixing portion integrally provided with the insertion portion and fixed to the wiper blade,
    wherein the insertion portion includes a first fastener caught by a hole provided in an upper surface of the wiper arm, and
    a second fastener caught by a rib provided inside the wiper arm, and
    the second fastener is provided to be elastically deformed and provided to be switched from a) a first state in which the second fastener is elastically deformed by being pressed by the rib when the first fastener passes through the hole to b) a second state in which the second fastener passes the rib and is restored to an original state when the first fastener is moved in the hole and caught by the hole.

2. The wiper connector of claim 1, wherein the first fastener has a hook shape in which an upper end has relatively greater area than a lower end and is switched between the first state in which the upper end passes through the hole and the second state in which the lower end moves in the hole and at least a part of the upper end is misaligned with the hole.

3. The wiper connector of claim 2, wherein, in the second state, the upper end of the first fastener faces the upper surface of the wiper arm to limit movement of the wiper arm in a height direction.

4. The wiper connector of claim 1, wherein the second fastener has a cantilever shape, and
    has a pressing portion that induces deformation of the wiper arm in a width direction while pressed by the rib, and
    a button portion that integrally moves with the pressing portion and has at least a part exposed to the outside.

5. The wiper connector of claim 4, wherein, in the second state, the pressing portion faces the rib in a longitudinal direction of the wiper arm to limit movement of the wiper arm in the longitudinal direction.

6. The wiper connector of claim 4, wherein one surface of the pressing portion facing the rib has an inclined surface or curved surface shape.

7. The wiper connector of claim 4, wherein the second fastener is switched from the second state to a third state in which, when the button portion is deformed by an external force, the pressing portion is misaligned with the rib to allow the movement in a longitudinal direction.

8. A wiper blade assembly comprising:
    the wiper connector of claim 1; and
    the wiper blade connected to the wiper connector and being in close contact with a surface of a close contact target to slide along the surface,
    wherein the wiper connector further includes a base portion provided on the wiper blade, and
    the fixing portion is rotatably connected to the base portion.

9. The wiper blade assembly of claim 8, wherein the washing liquid spray nozzle provided on the wiper arm comprises a pair of washing liquid spray nozzles which are provided in parallel to each face an end of the wiper arm, and
    the insertion portion is disposed between the pair of washing liquid spray nozzles.

\* \* \* \* \*